Jan. 31, 1967 C. J. CLEMENTS, JR 3,301,955

TELEPHONE AMPLIFIER

Filed May 14, 1963

INVENTOR.
Clarence J. Clements, Jr.
BY
Bacon & Thomas
ATTORNEYS

United States Patent Office 3,301,955
Patented Jan. 31, 1967

3,301,955
TELEPHONE AMPLIFIER

Clarence J. Clements, Jr., Silver Spring, Md., assignor to Prototypes, Incorporated, Kensington, Md., a corporation of Maryland Filed May 14, 1963, Ser. No. 280,251
3 Claims. (Cl. 179—1)

This invention relates to telephone amplifiers and particularly to compact portable devices adapted to be clipped or removably attached to a telephone receiver to amplify the sound for persons who may be hard of hearing.

Many devices of this same general nature have been proposed heretofore but the present invention differs therefrom in respects which will be pointed out hereinafter.

Applicant has discovered that telephones produced several years ago and a great many of which are still in use are constructed somewhat differently from those of current construction, a great many of which are also in use. Applicant is not aware of what differences there are in the construction of those different telephones but has discovered that detection of the modulated magnetic field in the vicinity of a telephone receiver of one type can be detected satisfactorily only by a magnetic induction coil arranged with its axis perpendicular to the plane of the vibrating diaphragm of the telephone whereas in the other group of telephones, detection and amplification can be performed satisfactorily only when the axis of the pick-up coil is arranged in a plane parallel to the telephone receiver diaphragm and properly oriented in that plane, as stated. Applicant is unable to explain why this difference exists but has found that an amplifier designed for use with older telephones is ineffective to detect and amplify the signals in one of the newer telephones and vice versa. By the present invention applicant has devised an amplifier with the axis of the pick-up coil arranged at an oblique angle to the plane of the telephone diaphragm and finds that excellent results can be obtained with either the older or newer types of telephone receiver. It has been found that by arranging the pick-up coil with its axis at an oblique angle within the range of about 25° to 45° relative to the diaphragm equally good signals can be detected from either type of telephone and amplified and reproduced with reasonably good fidelity. The present invention further involves means whereby the amplifier may be removably secured to a telephone receiver with the pick-up coil held at the described angle but yet freely rotatable about an axis perpendicular to the diaphragm to achieve optimum results with a minimum of interference from extraneous fields. The invention further involves a safety switch arranged to deenergize the amplifier when the device is in a particular attitude, novel shielding to exclude extraneous magnetic fields and to prevent feed back and novel features of a battery case.

It is, therefore, an object of this invention to provide a portable telephone amplifier adapted for use with the receiver of any telephone presently in use.

Another object is to provide a device of the type set forth, including a safety switch to disconnect a power source from the amplifier when the device is placed in a predetermined attitude.

Still another object of the invention is to provide an amplifier of the type set forth, including novel shielding means preventing feed back from a speaker to a pick-up coil, thus permitting a higher degree of amplification.

A further object is to provide a device of the type set forth, including a novel battery case and closure.

Other and additional objects and advantages will become apparent to those skilled in the art as the description proceeds with reference to the accompanying drawings wherein.

Figures 1, 2, 3, 4, 5, 6:
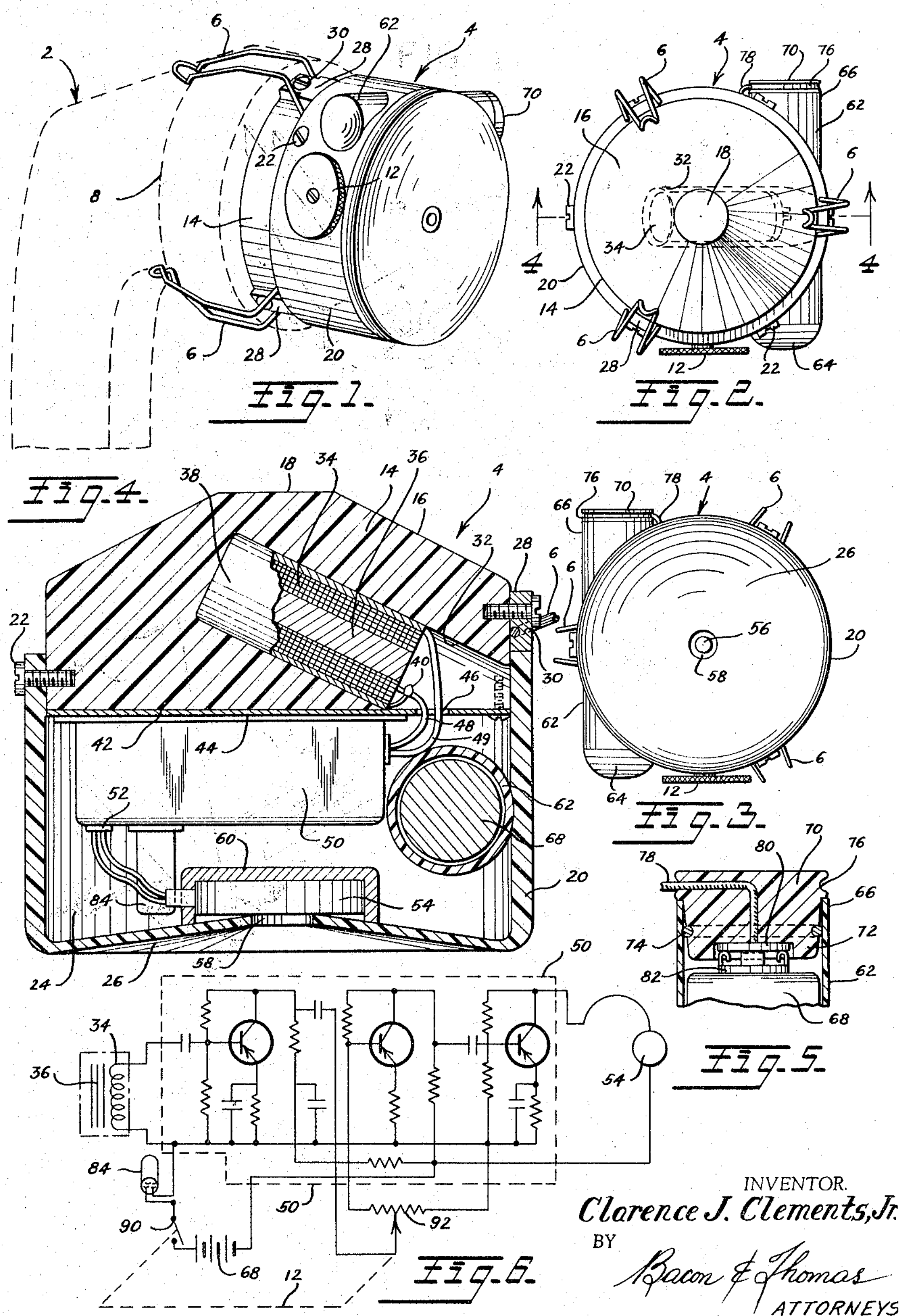
FIG. 1 is a perspective view of a device embodying the invention attached to a conventional telephone receiver, shown in dotted lines.
FIG. 2 is an end view as seen from the left end of the device shown in FIG. 1.
FIG. 3 is an elevational view of the right hand end of the device of FIG. 1.
FIG. 4 is an enlarged axial sectional view taken along the line 4—4 of FIG. 2.
FIG. 5 is an enlarged fragmentary sectional view taken through the closure for the battery case.
FIG. 6 is a schematic circuit diagram of the amplifier and related parts.

In FIG. 1, numeral 2 indicates a conventional telephone receiver of the handset type and shows the device of this invention secured to the earpiece or receiver portion thereof. The invention comprises a body or housing 4 having spring clips 6 thereon for frictional engagement with a bead or the like 8 customarily present on telephone receivers. The housing 4 includes a battery case 62 and a manual control wheel 12 which operates an on-off switch and a volume control potentiometer, which will be described in more detail later. Referring to FIG. 4, the housing 4 comprises a solid portion 14 of plastic material or the like having one surface, comprising portions 16 and 18, configured substantially complementary to the front face of the telephone receiver. That front face is usually concave for snug application to the user's ear and the surfaces 16 and 18 conform quite closely to that concavity. A hollow housing portion 20 of the cup-like configuration telescopically embraces a portion of the member 14 and is secured thereto by screws 22 to define a chamber 24. The outer face of the portion 20 opposite the surfaces 16 and 18 is somewhat dished at 26 to define an ear engaging portion.

The spring clips 6 are pivotally secured to the body 4 by means of notched blocks 28 screwed to the body member 14 and defining pivot mountings for the spring clips. Each block is provided with shoulders 30 limiting outward pivotal movement of the spring clips 6 whereby the clips can then be sprung over the bead 8 only by resiliently distorting the same. Thus, the body may be releasably and resiliently held against the earpiece and as is obvious, can be rotated relative to the earpiece about an axis extending centrally of the housing 4. Telephone receivers are conventionally provided with a diaphragm actuated by an electromagnet to produce sound waves. That diaphragm extends generally parallel to the front face of the receiver, previously referred to, and defines what will herein be termed a "reference plane."

As shown in FIG. 4, the body portion 14 is provided with an angular bore 32 in which a magnetic pick-up coil is mounted. The coil comprises an induction coil 34 wound on a ferromagnetic core 36 and arranged in the base 32 with its axis extending in such direction that when the device is applied to a telephone receiver as shown in FIG. 1, the axis of the coil 34 extends oblique to the reference plane previously referred to. It has been found that by arranging the coil at the described oblique angle, a usable signal can be picked up from either the old or new telephone, as previously mentioned herein, whereas if the coil were arranged with its axis either parallel to or perpendicular to that reference plane, satisfactory results could be obtained only with one type of telephone, not with the other.

As also shown in FIG. 4, the induction pick-up coil 34 is provided with an electrostatic shield comprising a layer 38 of copper foil surrounding the coil and electrically connected to the "ground" or chassis side of the coil 34 as at 40. The inner face 42 of the body portion 14 is covered by a ferromagnetic shield plate 44 having an opening 46 through which the leads 48 and 49 from coil 34 extend. The leads 48 and 49 extend into and are suitably connected to the input of an amplifier schematically shown at 50 in the chamber 24. The output 52 of the amplifier 50 is connected to a miniature speaker 54 of known type wherein sound is radiated from an opening 56, which is shown herein as being in a boss 58 projecting through a central opening in the ear-engaging wall of the body portion 20. The speaker 54 thus radiates sound outwardly of the housing 4 in a direction away from the one surface thereof defined by the portions 16 and 18. The miniature speaker 54 is of a conventional type and has a ferromagnetic diaphragm therein and an electromagnetic means actuated by the output current from amplifier 50. Since the speaker 54 is electromagnetically operated, it creates a magnetic field in its vicinity. Since the amplifier 50 is a high gain amplifier and since the pick-up coil 34 is physically quite close to the speaker 54, measures are taken to prevent feed back from the magnetic field created in the speaker 54 to the pick-up coil 34. The ferromagnetic shield plate 34, previously described, provides some such shielding but to insure complete shielding, the speaker 54 is surrounded by a cup shaped shield 60 of ferromagnetic material, which cup is open outwardly of the housing 4 and encompasses the speaker structure. It has been found that the shields 44 and 60 and the electrostatic shield 38 results in an extremely sensitive amplifying device capable of detecting very weak magnetic signals at the receiver portion of the telephone and amplifying those signals many times to provide loud enough sound output at the speaker 54 to provide adequate hearing for persons very hard of hearing. The shielding described permits the higher amplification without distortion due to feed back.

The control wheel 12, previously referred to, operates an on-off switch and a volume control potentiometer, all as is well known in this and related arts.

A tangential bore is provided in the portion 20 of the housing 4 and in which a tubular shell 62 is cemented or otherwise fixed. The shell 62 is provided with a closed end 64 and an open end 66 and defines a battery case for a power supply battery 68. The battery 68 is a conventional miniature battery comprising a plurality of dry cells arranged to produce the desired voltage. The battery case 62 is provided at its open end 66 with a closure 70 (see FIG. 5) having a plug portion 72 receivable in the open end of the casing 62. The plug portion 72 is provided with an O-ring 74 of rubber or the like to not only effect a seal against the entry of moisture but to also serve as a friction retaining means to hold the closure 70 in place. The outer end of the closure 70 is provided with a circumferential groove 76 adapted to be engaged by the user's fingernail or other suitable tool to effect removal of the closure for replacement of battery 68. A conductor 78 extends through the closure 70 and terminates in a contact 80 engageable with one of the terminals 82 of the battery 68. Obviously, the interior of the casing 62 is provided with a further contact engaging the other terminal of the battery 68, but not shown herein.

In FIG. 4, numeral 84 designates a mercury switch of known type arranged in the power circuit, as will be shown later, to disconnect the battery 68 from the amplifier 50 when the device is placed in a predetermined position or attitude, for example, with its telephone-receiver-engaging surface 16–18 uppermost. Thus, the device may be used by a hard of hearing person and even though the person may forget or neglect to operate the wheel 12 to open the on-off switch after finishing his conversation and replaces the instrument on the usual cradle, the mercury switch 84 will operate to disconnect the battery 68 from the amplifier 50 and thus prevent discharging the battery when the device is not in use. It is to be noted that when a telephone handpiece of the type shown at 2 is placed on its conventional cradle, the receiver portion faces downwardly so that the device of the present invention, as attached thereto, would assume generally the position shown in FIG. 4 wherein the mercury switch 84 is effective. In any other attitude or position, the mercury switch 84 completes the desired circuit.

FIG. 6 comprises a schematic diagram of the circuitry involved in the present invention. The on-off switch 90 and the volume control potentiometer 92 are jointly controlled by the control wheel 12, schematically indicated in this figure by the dotted line connection. The mercury switch 84 is shown connected in the circuit by which power from the battery 68 is supplied to the amplifier 50 and in series with the on-off switch 90. The amplifier circuit is of a conventional type and need not be further described except to note that it is a transistorized circuit whereby the entire device can be constructed to occupy a very small space and comprises 3 stages of amplification to provide very high gain.

While a single embodiment of the invention has been shown and described herein, it is to be understood that the same is merely illustrative of the principles of the invention and that other forms may be resorted to within the scope of the appended claims.

I claim:

1. A telephone amplifier device for use with a telephone receiver having a front face and a diaphragm therein adjacent said front face and defining a reference plane, said amplifier comprising: a body means for releasably holding said body with one surface thereof in fixed position against said front face; a magnetic pick-up coil in said body adjacent said one surface and fixed therein with its polar axis arranged at an oblique angle to said reference plane; amplifying means in said body; a miniature speaker in said body and arranged to radiate sound from the side of said body opposite said one surface; and circuit means connecting said pick-up coil to the input of said amplifying means and connecting the output of said amplifying means to said speaker, said speaker including an electromagnet energized by said amplifying means output; and ferromagnetic shield means between said speaker and said amplifying means and between said pick-up coil and said amplifying means whereby to minimize feedback coupling between said speaker and said pick-up coil.

2. A device as defined in claim 1 wherein shield means comprises an outwardly open ferromagnetic cup embracing said speaker and a ferromagnetic plate extending across said body between said pick-up coil and said amplifying means.

3. A telephone amplifier device for use with a telephone receiver having a front face and a diaphragm therein adjacent said front face and defining a reference plane, said amplifier comprising: a body means for releasably holding said body with one surface thereof in fixed position against said front face; a magnetic pick-up coil in said body adjacent said one surface and fixed therein with its polar axis arranged at an oblique angle to said reference plane; amplifying means in said body; a miniature speaker in said body and arranged to radiate sound from the side of said body opposite said one surface; and circuit means connecting said pick-up coil to the input of said amplifying means and connecting the output of said amplifying means to said speaker, said amplifying means including a power source and a switch arranged to disconnect said power source from said amplifying means, said power source comprising a dry-cell battery; a recess in said body, opening to the exterior thereof, for housing said battery; a closure for said recess and having a plug portion receivable therein; and O-ring seal between said plug portion and the side wall of said recess for sealing said recess and frictionally holding said closure in place.

References Cited by the Examiner

UNITED STATES PATENTS

| | | | |
|---|---|---|---|
| 2,406,583 | 8/1946 | Blauvelt | 179—107 |
| 2,544,027 | 3/1951 | King | 179—107 |
| 2,847,506 | 8/1958 | Grey et al. | 179—107 X |
| 2,913,577 | 11/1959 | Johnson | 179—35.4 X |

WILLIAM C. COOPER, *Acting Primary Examiner.*

ROBERT H. ROSE, *Examiner.*

S. J. BOR, R. S. BELL, *Assistant Examiners.*